United States Patent [19]

Lewis, Jr. et al.

[11] Patent Number: 4,574,973
[45] Date of Patent: Mar. 11, 1986

[54] DOOR SYSTEM FOR PRECIPITATORS AND THE LIKE

[75] Inventors: Robert L. Lewis, Jr., Baxley, Ga.; J. Albert Hudson, Knoxville, Tenn.

[73] Assignee: Environmental Products & Services Co., Inc., Skillman, N.J.

[21] Appl. No.: 731,473

[22] Filed: May 7, 1985

[51] Int. Cl.[4] ...................... B65D 43/16; B65D 43/18; B65D 51/18
[52] U.S. Cl. ................................. 220/259; 220/256; 220/314
[58] Field of Search ............... 220/255, 256, 259, 314, 220/329

[56] References Cited

U.S. PATENT DOCUMENTS 2,105,248  1/1938  Johnson .............................. 220/259
4,127,215 11/1978  Morrison ............................. 220/256

Primary Examiner—George T. Hall
Attorney, Agent, or Firm—Kimmel, Crowell & Weaver

[57] ABSTRACT

An entrance doorway for electrostatic precipitators, bag houses, scrubbers, ductwork and breeching includes an interior metal plate door hinged to a frame plate of similar thickness whereby the interior door and frame plate will follow any warpage of the casing wall as they are subjected to the same temperatures as the casing wall. A hollow core high temperature acid-resistant resilient gasket is employed between the interior door and its frame plate. A pressure screw acting on the center of the interior door flexes it toward the interior of the casing and renders the interior door concave to form a tight seal with the gasket. An interior door retractor is provided to pull the interior door and its gasket away from the frame plate when the pressure screw is relieving pressure on the interior door, thereby preventing damage to the door gasket. An adjustable length telescoping sleeve fixed to the interior door frame plate extends away from the interior door and supports a lightweight thermally insulated exterior door panel which is removably secured by corrosion-resistant latches. The door system eliminates air infiltration and corrosion.

14 Claims, 9 Drawing Figures

U.S. Patent  Mar. 11, 1986  Sheet 2 of 2  4,574,973
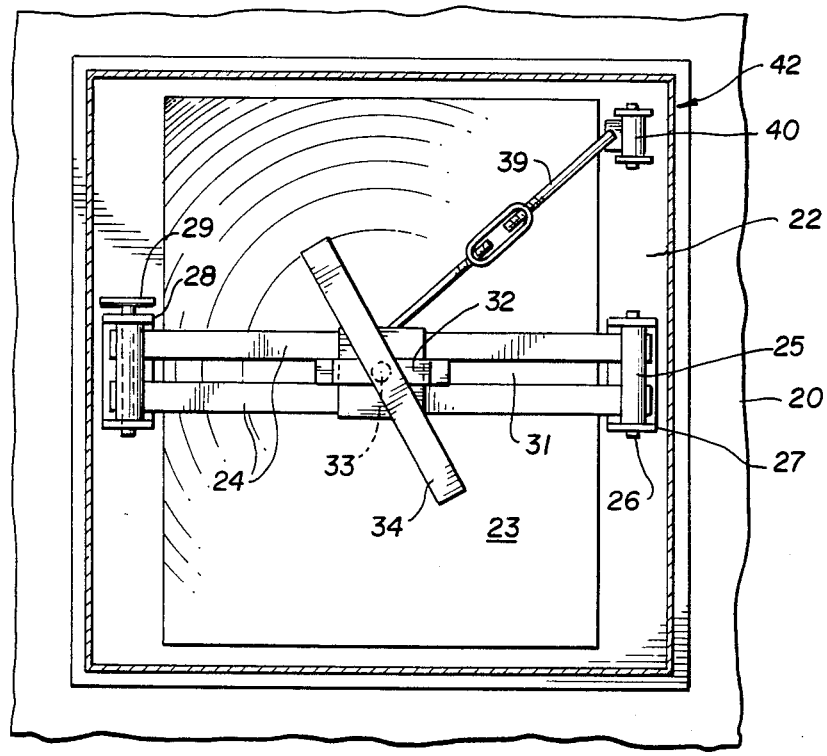
FIG.3
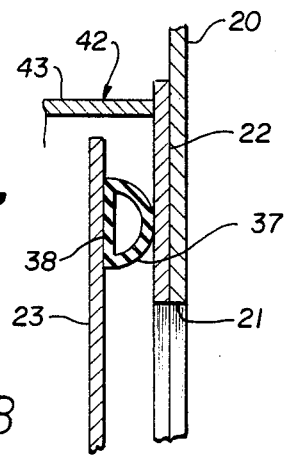
FIG.5
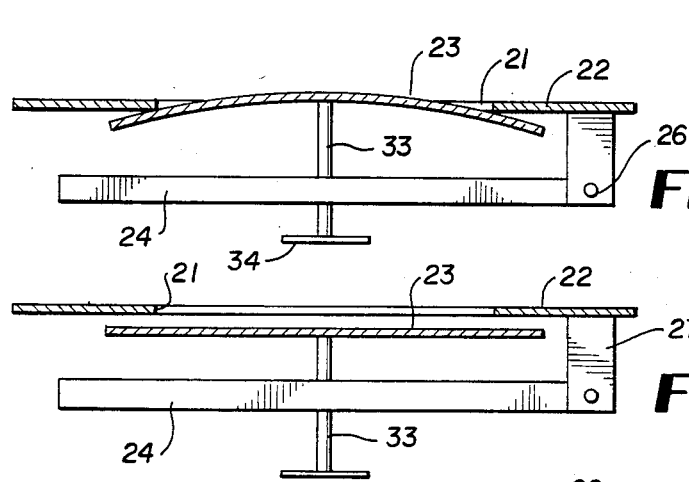
FIG.7
FIG.8
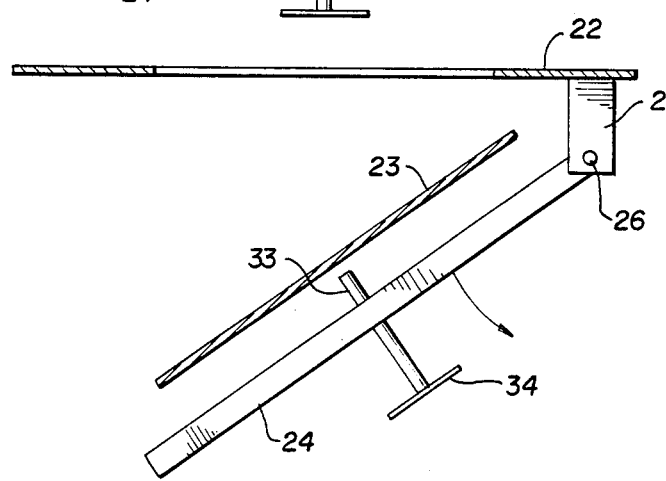
FIG.9

4,574,973

DOOR SYSTEM FOR PRECIPITATORS AND THE LIKE

BACKGROUND OF THE INVENTION

Entrance doorways are required on precipitators, bag houses, scrubbers and the like to allow maintenance personnel to enter through the casing of the device periodically. If, during the course of operation of the device after the entrance doorway was last opened, there has been some leakage, corrosion will occur at the juncture of the door system and casing, resulting in deterioration of the casing wall, door and door frame, as well as failure of the door gasket. This problem generally requires rather costly repair work on the door system to restore it to a proper working condition. It is the principal object of the present invention to provide an improved door system for the above-stated and similar industrial applications which will eliminate substantially the above problems arising due to opening and closing of the door system periodically.

Another important object of the invention is to provide a dual door system including an interior metal plate somewhat flexible sealing door having a high temperature acid-resistant hollow core resilient gasket around its perimeter for engagement with an opposing door frame plate on the casing wall of the industrial unit. The interior door is hinged to the door frame plate and is equipped with a means to apply pressure to the center of the interior door to flex it inwardly to a somewhat concave form, thereby assuring a tight seal. An exterior lightweight thermally insulated door panel is removably latched on the exterior end of an adjustable length sleeve extending between the interior door frame and the exterior door panel. A dead air space between the interior door and exterior insulated door panel and within the sleeve allows the temperature in the dead air space to be decreased through the acid dew point, thereby eliminating corrosion at the juncture of the interior door and the adjacent casing wall of the industrial unit.

Another object of the invention is to provide a door system of the above type for industrial devices in which the interior somewhat flexible sealing door plate is equipped with an anti-sagging means and a retracting means used to pull the interior door and its gasket away from the adjacent door frame plate when inward flexing pressure on the interior door is being released.

Other objects and advantages of the invention will become apparent to those skilled in the art during the course of the following description.

BRIEF DESCRIPTION OF THE DRAWINGS

FIG. 3 is a front elevation showing the interior door and associated elements.

FIG. 5 is a fragmentary vertical section taken on line 5-5 of FIG. 1.

FIGS. 7, 8 and 9 are partly schematic horizontal sections through the interior door and its opposing frame showing the interior door in different operative positions.

DETAILED DESCRIPTION

Figure 1:
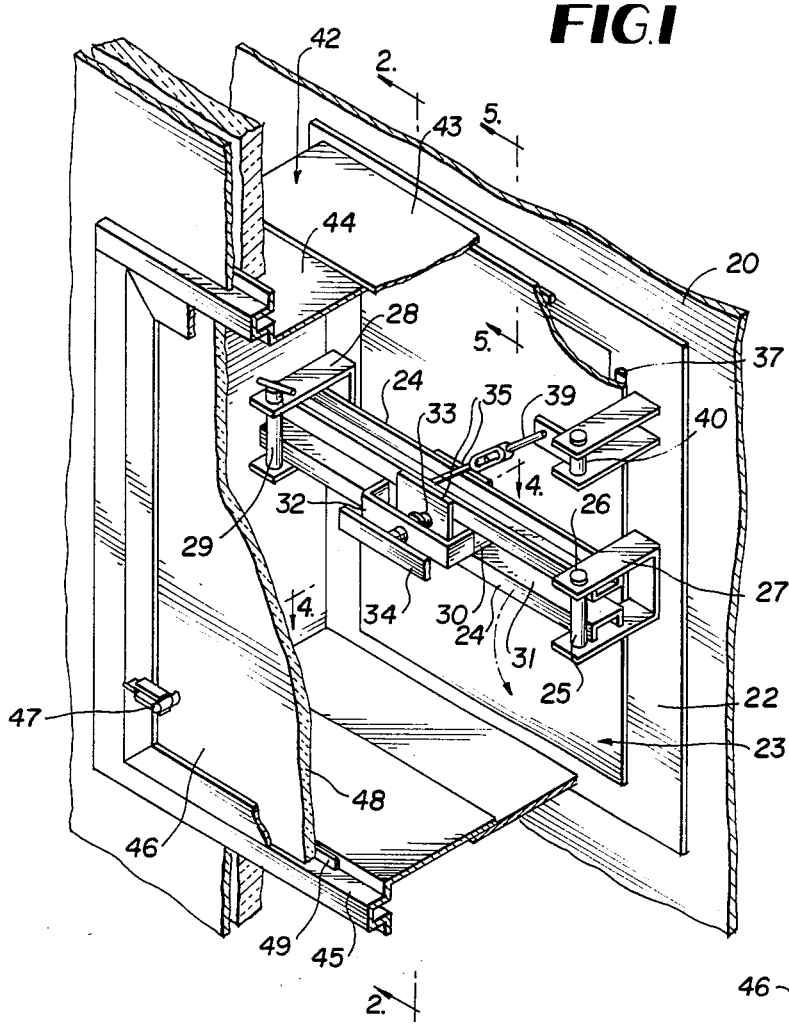
FIG. 1 is a fragmentary perspective view, partly in cross section, showing a door system according to the present invention.

Referring to the drawings in detail wherein like numerals designate like parts, the numeral 20 denotes the casing wall of an electrostatic precipitator, scrubber or the like having a rectangular access opening 21 through which maintenance personnel may enter the casing at required times. A flat rectangular frame plate 22 is fixed as by welding to the casing wall 20 and preferably is formed from steel plate stock having a thickness of $\frac{1}{4}''$-5/16". The frame 22 is in direct thermal contact with the casing wall 20 and therefore is subjected to the identical temperature changes as the casing wall, which changes will range from 0°–400° F.

An interior door 23 in the form of a normally flat steel plate having a thickness of about $\frac{1}{4}''$ is hinged to the frame 22 in the following manner. A pair of horizontal vertically spaced back-to-back parallel channel bars 24 are secured at corresponding ends to a vertical hinge sleeve 25 journaled on a pintle 26 held in a support bracket 27, fixed to one vertical side of the frame 22 near the center of its height. The far ends of the channel bars 24 are received in a similar bracket 28 fixed at the same height to the other side of the frame 22. The bars 24 are releasably held in the bracket 28 by a removable vertical retainer pin 29 equipped with a handle, as shown.

Near its center, the interior door 23 has a pair of spaced parallel door support arms 30 fixed thereto and extending into the slot 31 formed between the channel bars 24 and being movable therein. Through the two arms 30, the weight of the door 23 is transferred to the bars 24. At their forward ends, the arms 30 are attached as by welding to a U-bracket 32. This bracket with the arms 30 forms a means for retracting or pulling the interior door 23 and its gasket 37 away from the frame 22 at proper times. The supporting arrangement for the door 23 through the arms 30 and bars 24 allows some shifting or adjusting of the interior door relative to the frame 22 as well as retraction of the door from this frame.

Figure 2:
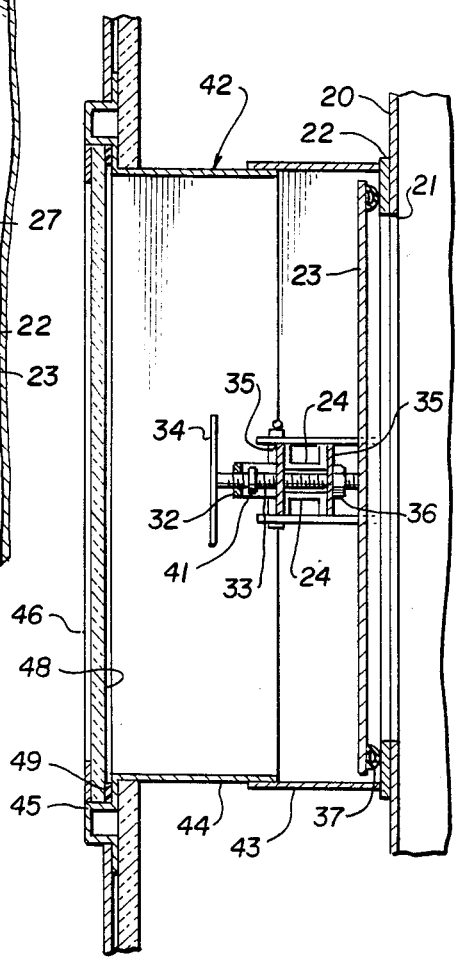
FIG. 2 is a vertical section taken on line 2—2 of FIG. 1.

The means for applying pressure to the center of the door 23 comprises a stainless steel screw 33 at the center of the door and perpendicular thereto. The screw 33 is disposed between the two arms 30 and channel bars 24 at the longitudinal centers of the latter. This screw 33 carries a turning and pulling handle 34 at its outer end in spaced relationship to the bracket 32. A pair of guide plates 35 for the screw 33 having unthreaded screw guiding openings are fixed as by welding to the opposite vertical faces of the channel bars 24. A nut 36 is welded to the innermost plate 35, FIGS. 2 and 4, and has threaded engagement with the screw 33.

When the screw is turned in the direction to move it toward the interior door 23, its eading end will engage the door at its center, as indicated in the drawings,and further turning of the screw 33 exerts sufficient pressure on the door 23 to flex the door inwardly toward the interior of the casing. The door 23 assumes a shallow spherically concave form shown on an exaggerated scale in the drawings for clarity of illustration.

Near its perimeter and on its face opposing the frame 22, the door 23 has a high temperature acid-resistant hollow core gasket 37 secured thereto and extending continuously around its perimeter. The gasket 37 is preferably semi-circular in cross-section with its flat wall 38 secured to the plate forming the door 23. The gasket 37 has a strong elastic memory so that it will return readily to its normal shape following compression between the door 23 and frame 22. The gasket is a state of the art item.

Figure 6:
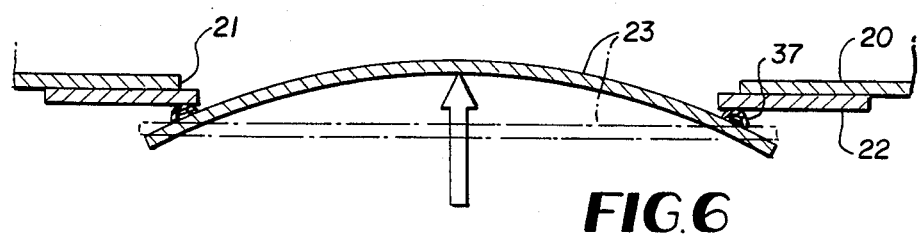
FIG. 6 is a cross sectional view taken through the interior door of the door system while in a flexed sealing position in response to pressure being exerted on the center of the interior door.

When the pressure screw 33 forces the door 23 into its concave formation, FIGS. 6 and 7, the gasket 37 has its curved wall forced into extremely tight continuous sealing engagement with the frame 22 to preclude all leakage.

The hinged interior door 23 is equipped with an anti-sag brace rod 39 which may be adjustable, as illustrated, or non-adjustable following its original installation. The upper end of the brace rod 39 is attached to a vertical axis hinge 40 on the frame 22 above and coaxially aligned with the hinge structure carrying the bars 24 and the elements thereon. The lower end of the brace rod 39 is attached to the upper bar 24 near its longitudinal center.

Figure 4:
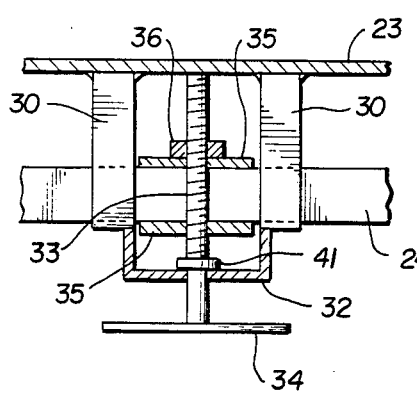
FIG. 4 is a fragmentary horizontal section taken on line 4—4 of FIG. 1.

As best shown in FIG. 4, the pressure screw 33 has a fixed stop collar 41 thereon between the bracket 32 and the outermost plate 35. When the screw 33 is backed away from the interior door 23 allowing the door to return to its normal flat state, FIGS. 4 and 8, the collar 41 will contact the bracket 32 and further turning of the screw away from the door 33 will cause the door to begin moving away from the frame 22 with its attached gasket 37. By this means, the door 23 can separate from the 1 frame 22 a distance of about ½". At this time, the retainer pin 29 is pulled and the handle 34 is grasped to pull the door 23 toward the open position shown in FIG. 9. This opening or retracting of the door 23 substantially simultaneously with or closely following the breaking of the seal between the gasket 37 and frame 22 avoids damaging the gasket due to shearing forces which would occur if the door 23 were pulled open before relieving the flexing pressure being exerted by the screw 33.

The door system further comprises an adjustable length telescoping sleeve 42 having one sleeve section 43 anchored to the frame 22 and engaged telescopically with a second sleeve section 44. At its exterior end remote from the casing wall 20, the sleeve section 44 is formed to provide a perimeter support frame 45 for a lightweight exterior door panel 46 secured removably on the adjustable sleeve 42 by stainless steel latches 47. The exterior door panel 46 is provided with high efficiency thermal insulation 48 of the required thickness.

An adjustable dead air space is thus created between the interior sealing door 23 and the exterior door panel 46 and the length of this dead air space can be adjusted through a fairly wide range, as required. This adjustment allows the door system to accommodate certain structural members existing on precipitators or other equipment. The dead air space is also used to reduce the temperature therein through the acid dew point, thereby removing it from the area of the interior door 23 and door gasket 37. This substantially eliminates acid corrosion.

The dual door system provides ready access to the interior door and dissipates the temperature in the dead air space to ambient temperature plus about 50° F. maximum.

Preferably, the exterior door panel 46 is provided with a resilient gasket 49 around its perimeter.

The door system, in addition to providing an ultra-tight sealing arrangement and the substantial elimination of corrosion, possesses other notable advantages including the following. The interior door 23 and its plate frame 22 are sufficiently flexible to conform to any warping pattern in the casing wall 20, helping to maintain a tight seal. The door 23 and frame 22 are designed so that their respective temperatures will always be substantially the same as that of the casing wall 20, thereby eliminating differential temperatures, different magnitudes of thermal expansion, misalignment of parts and leakage.

Schematic FIGS. 7, 8 and 9 show the three operative positions of the interior door 23. FIG. 7 shows the door 23 in a concave flexed condition under pressure transmitted to it by the screw 33. At this time, the gasket 37 is compressed and is in tight sealing relationship with the opposing flat frame 22. FIG. 8 shows the door 23 returned to its normal flat state with the screw 33 backed off sufficiently to break the seal between the gasket 37 and frame 22, at which time the door 23 can swing open slightly under influence of the collar 41 acting on the bars 24 responsive to pulling on the handle 34 following removal of the retainer pin 29.

It may now be seen that the interior door 23 is bodily supported somewhat adjustably through its attached arm 30 and the 24 with which the arms 30 are movably engaged. The door 23 is indirectly hinged to the frame 22 through the support arms 30 and bars 24.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. An entrance doorway for industrial equipment comprising a frame plate adapted for attachment to a casing wall of an industrial equipment unit adjacent to an access opening in such wall, an interior door plate hingedly mounted on the frame plate for horizontal swinging between a closed sealing position and an open position, a resilient gasket on and extending continuously around the perimeter of the door plate in opposing relationship to the frame plate, means connected with the interior door plate and being operable to exert pressure on the door plate substantially at its center to flex the door plate toward said casing wall and render it somewhat concave temporarily thereby compressing said gasket and forming a tight seal between the interior door plate and said frame plate, said means also being operable to relieve the pressure on said door plate whereby the door plate returns automatically to a normal flat state to break the seal between the door plate and frame plate, said means then being operable to pull the interior door plate to an open position, an adjustable length sleeve secured to said frame plate in surrounding relationship to the interior door plate and extending outwardly therefrom, and a thermally insulated exterior door panel removably held on said sleeve in spaced relationship to the interior door plate, there being a substantially dead air space within said sleeve and between the interior door plate and the exterior door panel.

2. An entrance doorway for industrial equipment as defined in claim 1, and said means comprising a hinged releasable locking bar assembly across the interior door plate horizontally in spaced relationship thereto, interior door plate supporting and retractor elements secured to said door plate and being engaged with said locking bar assembly, a pressure screw threadedly engaged with the locking bar assembly and being turnable in one direction to exert deforming pressure on the interior door plate substantially at its center and being turnable in the opposite direction to relieve said deforming pressure so that the door plate can return to its normal flat state, and an element fixed on said screw and engaging said door plate supporting and retractor elements substantially simultaneously with the relieving of the deforming pressure by said screw whereby the interior door plate may be swung open on its hinges.

3. An entrance doorway for industrial equipment as defined in claim 2, and a turning and pulling handle on said screw.

4. An entrance doorway for industrial equipment as defined in claim 2, and said locking bar assembly comprising a pair of spaced parallel bars defining a passageway between them and being hingedly connected to said frame plate at one side of the interior door plate, a releasable locking device for said pair of spaced parallel bars on the other side of said frame plate, said interior door plate supporting and retractor elements being engaged in said passageway, said pressure screw extending across said passageway and between said bars, at least an unthreaded guide plate for said screw on said bars across said passageway and a threaded nut element fixed on said guide plate and being threadedly engaged with said screw.

5. An entrance doorway for industrial equipment as defined in claim 2, and said supporting and retractor elements comprising a pair of spaced arms on the interior door plate and being disposed on opposite sides of said pressure screw and said guide plate, and a bracket connected between the ends of said arms away from said door plate and extending across the axis of said screw and having a clearance opening receiving said screw, and said element fixed on said screw comprising a fixed stop collar which engages said bracket when said screw is moved to the pressure relieving position relative to said interior door plate.

6. An entrance doorway for industrial equipment as defined in claim 5, and said stop collar being disposed between said bracket and said bars.

7. An entrance doorway for industrial equipment as defined in claim 1, and an anti-sag brace connected with said interior door plate to prevent it from sagging on its hinges thereby protecting said gasket.

8. A door system comprising a frame member attached to a wall of a casing and extending around the perimeter of an opening in said wall, the frame member having a flat frontal face, an interior door having a resilient gasket on and extending continuously around the perimeter of the interior door in opposing relationship to said flat frontal face of the frame member, a pair of bars spaced from the interior door and being in spaced relationship and being hinged at corresponding ends to said frame member, releasable retaining means for the bars near their other ends to hold the bars substantially in parallel relationship to the interior door, support and retractor means for the interior door secured thereto and extending movably into the space between said bars and including an adjustable element operable to apply pressure to the interior door near its center to flex the interior door somewhat toward the casing wall and its opening, an adjustable length sleeve secured to the frame member in surrounding relationship to the interior door and said support and retractor means, and an exterior door panel removably held on said sleeve in spaced substantially parallel relationship to the interior door.

9. A door system as defined in claim 8, and the frame member and interior door each being formed of steel plate stock of approximately the same thickness.

10. A door system as defined in claim 9, and said gasket comprising a high temperature hollow core half-round gasket having its arcuate wall facing the flat frontal face of the frame member.

11. A door system as defined in claim 8, and an anti-sag device for the interior door connected between the frame member and one of said bars.

12. A door system as defined in claim 8, and said support and retractor means comprising at least a support arm fixed to the interior door and projecting therefrom into the space between said bars, said adjustable element operable to apply pressure to the interior door comprising a screw extending between said bars, a threaded element fixed to said bars and being threadedly engaged with said screw, a fixed stop element on said screw near the sides of said bars remote from the interior door, and an element fixed to said support arm and disposed in the path of movement of the fixed stop element on said screw.

13. A door system as defined in claim 12, and unthreaded guide means for said screw on said bars.

14. A door system comprising a frame member adapted for attachment to a casing wall adjacent to an opening in said wall, the frame member having a flat frontal face, an interior somewhat flexible door arranged in opposing relationship to the frame member and being equipped with a compressible resilient gasket on its face opposing said flat frontal face of the frame member, a supporting and carrier means for the interior door hinged to the frame member near one side of the interior door, a releasable retainer means for said supporting and carrier means near the other side of the interior door, support and retractor means for the interior door fixed to the interior door and being movably engaged with the supporting and carrier means, a screw to apply pressure to the interior door substantially at the center thereof with said supporting and carrier means, and an element fixed to said screw and being adapted to engage a part of the support and retractor means when the screw is turned in the direction to move it away from said interior door to relieve pressure thereon.

* * * * *